April 20, 1943.	A. PELTZER	2,316,807
STARCH MANUFACTURING PROCESS
Original Filed Sept. 11, 1934   3 Sheets-Sheet 1
FIG_1_
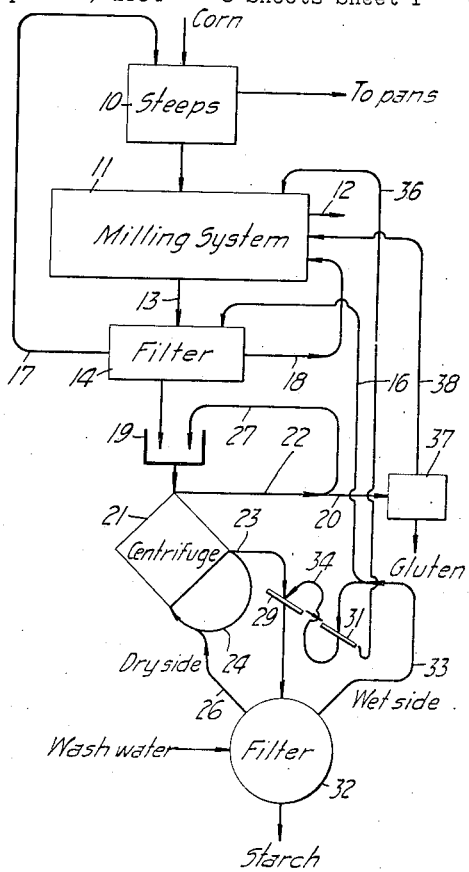
FIG_2_
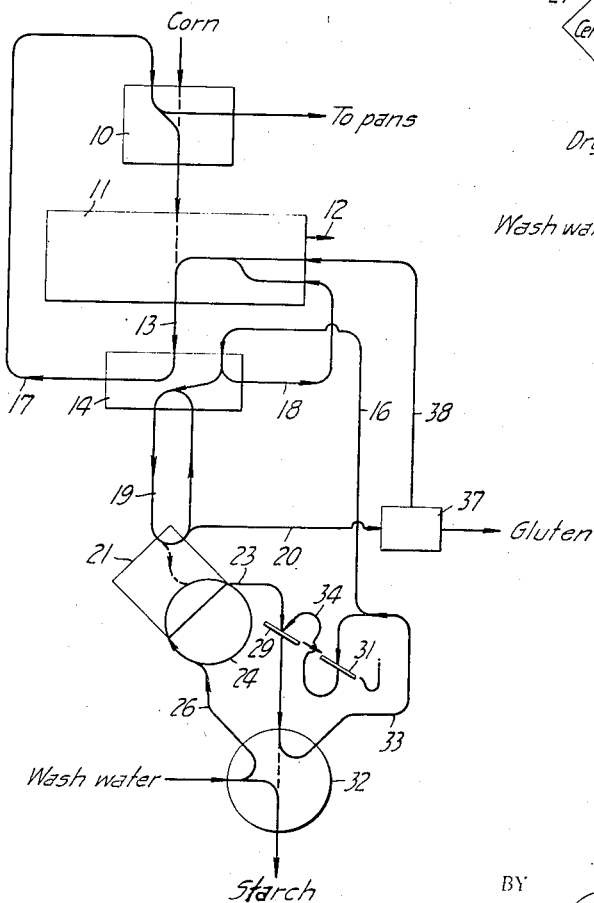
INVENTOR.
Albert Peltzer
BY
ATTORNEY.

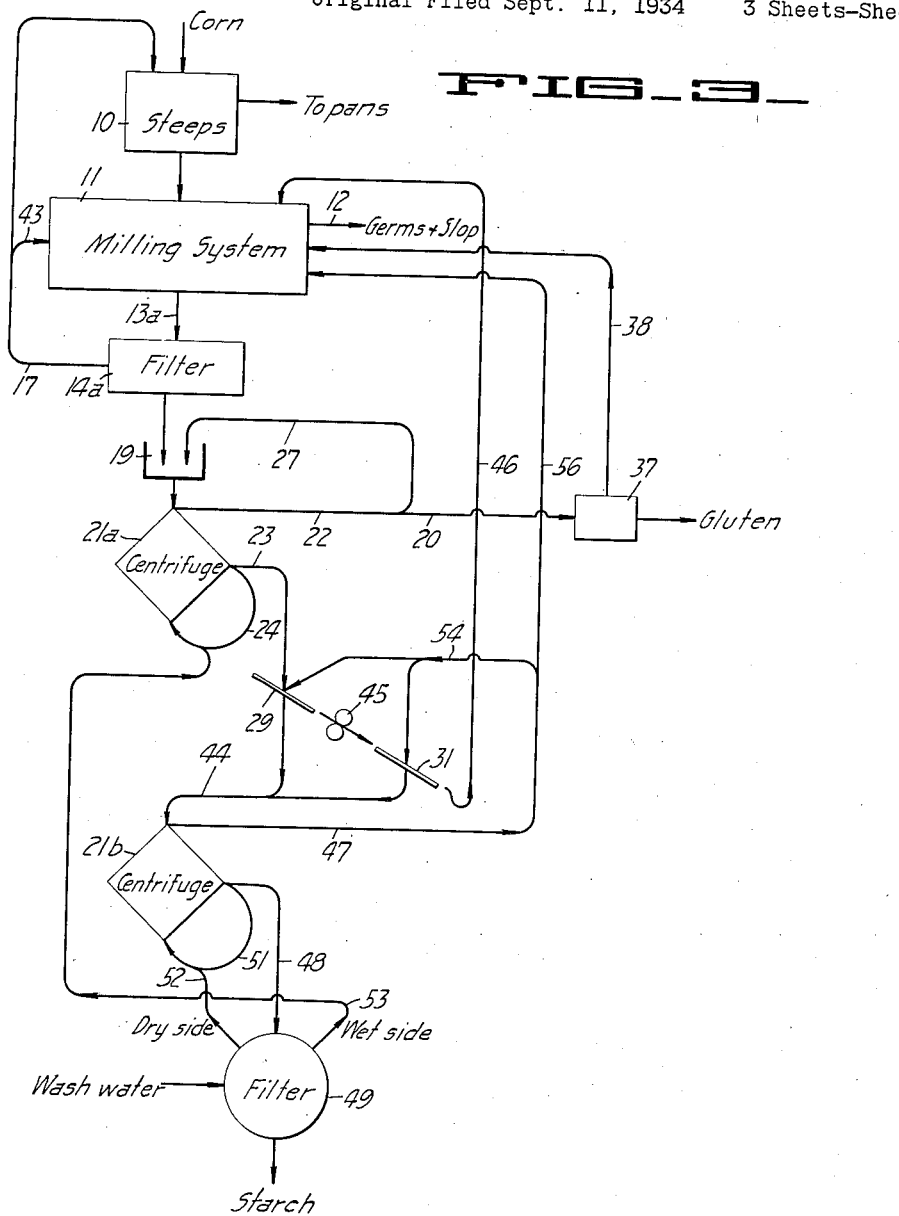

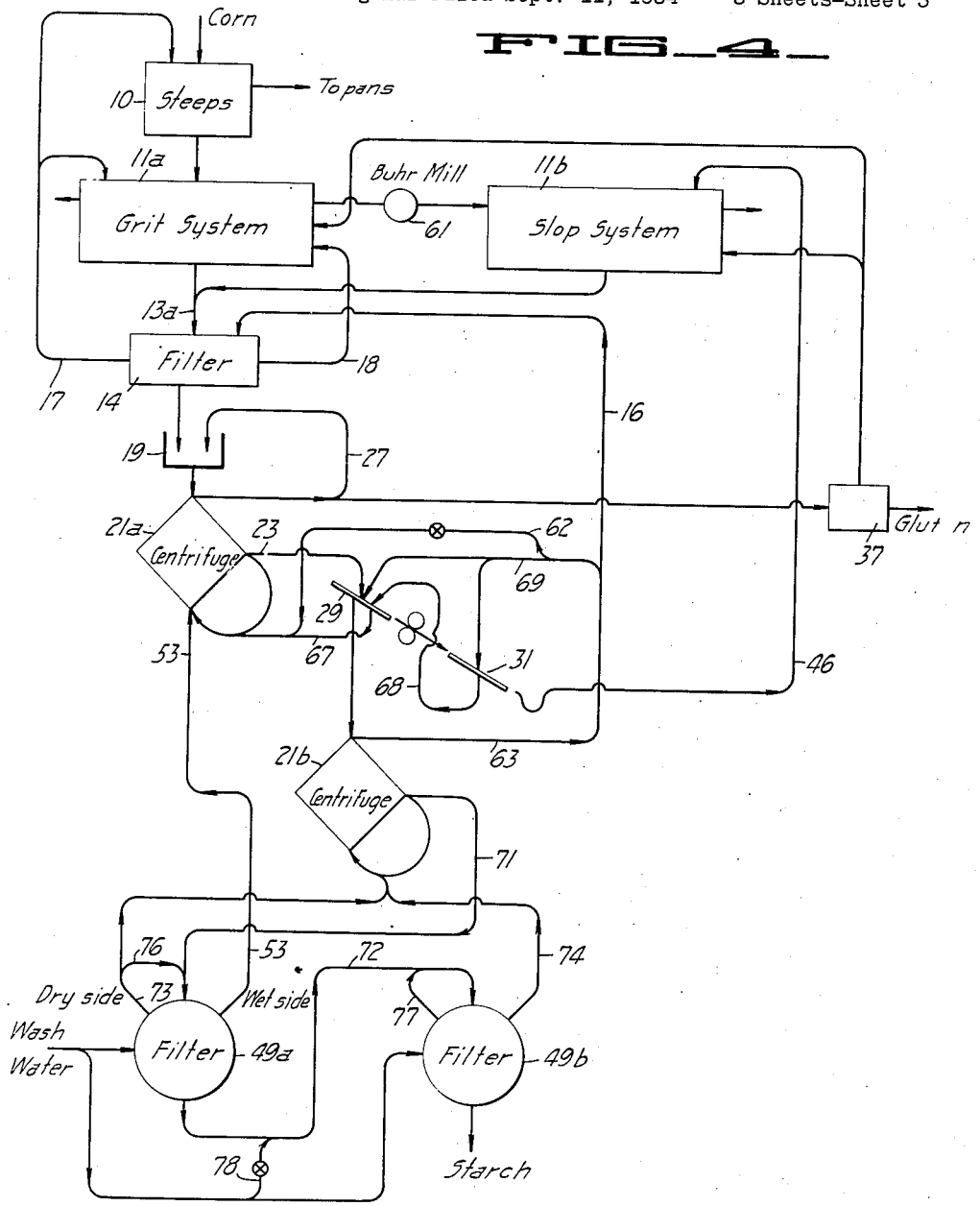

UNITED STATES PATENT OFFICE 2,316,807

STARCH MANUFACTURING PROCESS

Albert Peltzer, San Francisco, Calif.

Continuation of application Serial No. 743,529, September 11, 1934. This application March 25, 1938, Serial No. 198,089

12 Claims. (Cl. 127—68)

This invention relates generally to the manufacture of starch from natural starch-bearing material, such as corn, wherein the material is subjected to successive treatments, including wet milling and separating operations.

In wet starch manufacturing plants, important items in the cost of operation and production are the amount of fresh water consumed for a given quantity of the raw material treated, and the amount of water presented for evaporation in certain liquors, as for example water drawn from steeping apparatus which is generally delivered to the evaporating pans. In many instances the available supply of fresh water may be limited, or water charges may be relatively high. Likewise, in many localities stream pollution is prohibited, thus necessitating treatment of discarded liquors by evaporation. In the past, a degree of economy in this direction has been effected by routing liquors for re-use, as in bottled-up systems, but in such cases the process and the equipment utilized have been elaborated rather than simplified, and attendant operating difficulties have tended to increase rather than to be minimized.

The presence of so-called "solubles" has also afforded considerable difficulty in conventional wet starch manufacturing processes. Solubles tend to interfere with separating and washing operations, particularly as such operations have been carried out in the past. In conventional tabling operations, where a substantial amount of solubles is carried by the mill starch stream, they are not effectively displaced from the starch, with the result that the starch must be subjected to elaborate and repeated washing operations. Furthermore, solubles are generally associated with bacteriological action, which is recognized as a serious difficulty in maintaining silk screens in proper operation.

It is an object of the present invention to provide a novel wet starch manufacturing process which will make possible marked economy in the amount of fresh water required for a given capacity, and in the amount of water which must be disposed of in evaporators. As will be presently explained, this is accomplished by simplification in the equipment required as compared with prior conventional processes, and at the same time operating difficulties are greatly minimized.

It is a further object of the invention to provide a novel manner of handling solubles, whereby after primary separation between starch and gluten there will be a relatively low percentage of solubles in the separated starch, as compared with starch left on tables in conventional tabling operations. At the same time, my process obviates the usual disadvantages attendant upon having solubles present in the milling system.

A further object of the invention is to provide a novel manner of routing wash water through the process, whereby the separated starch is effectively washed without sacrifice of economy in the amount of wash water required or in the amount of water which must be evaporated.

Further objects of the invention are as follows: To facilitate and simplify silk screening as compared with conventional practice; to obviate the building up of slimes or like material resulting from the action of micro-organisms or bacteria; and to enable relatively rapid treatment of the starch bearing material with respect to its rate of movement through the process.

Additional objects of the invention will appear from the following description, in which the preferred embodiments of the invention have been set forth in detail in conjunction with the accompanying drawings.

Referring to the drawings:

Fig. 1 is a flow sheet illustrating a simplified process incorporating the present invention.

Fig. 2 is a flow sheet with respect to the same process as Fig. 1, but indicating the manner in which water is routed through the process.

Fig. 3 is a flow sheet illustrating a more elaborate embodiment of the process, in which a plurality of centrifuges are utilized in series, in conjunction with silk screening of the separated starch for the removal of fine slop.

Fig. 4 is a flow sheet illustrating a further modification of the process.

The various features of my process can best be understood after a description of the flow sheets illustrated in the drawings. Referring first to Fig. 1, the starch-bearing material being delivered from steeps 10 is introduced into the milling system 11, where it is treated with various apparatus, including the crackers, separators for removing germs, germ and grit reels for the removal of germs and grit, screening for the removal of coarse slop, and a Buhr mill or like milling equipment for the delivery of ground material to the slop system. The milling system departs from conventional practice in that fine screening, such as is accomplished by silk, is omitted from the slop system, thus causing to be present in the mill starch stream a substantial amount of the fine slop, since the copper screens of the slop system remove only the coarse slop. Removal of germs and slop is indicated at 12, and removal of the combined starch stream or starch bearing magma at 13.

Instead of immediately subjecting the mill starch stream 13 to tabling, I first pass it through a suitable filter or filters 14, to make possible a thickened feed to a subsequent centrifugal separating apparatus. It is desirable to subject the filter cake, before discharge, to a spray of wash water, as indicated by line 16. While a filtrate can be drawn off in a single stream for re-use, it is desirable in some instances to draw off the wet side filtrate 17 apart from the dry side filtrate 18. As a desirable utilization of these liquors, the wet side filtrate 17 is shown being returned to the steeps 10 for steeping the corn or like starch-bearing material, and the dry side filtrate 18 is shown being returned to the milling system 11 for re-use in various washing and milling operations. The function of the wash 16 is to effect a reduction of solubles in the filter cake; therefore the wash should contain a relatively low percentage of solubles, compared with the percentage of solubles in the mill starch stream 13, or in the filtrate 17. Assuming that two filtrates are drawn off from the wet and dry sides, the dry side filtrate 18 will contain a relatively lower percentage of solubles than the wet side filtrate 17.

After treatment in the filtering apparatus 14, the filter cake is subjected to repulping, as indicated at 19, and is then fed to the centrifugal separating apparatus 21. In the selection of a proper centrifuge, I prefer to employ one of the continuous type in which an additional liquor is introduced into the centrifuge rotor in addition to the feed, for aiding in carrying out the centrifugally separated starch particles. Such a centrifuge is disclosed and claimed in Peltzer Patents No. 1,923,454, dated August 22, 1933, and No. 1,945,786, dated February 6, 1934, in which a large part of the underflow is continuously returned into the centrifuge chamber, and in which a wash liquor is blended with the return. A Peltzer centrifuge has been indicated diagrammatically, line 22 representing a gluten overflow, line 23 a centrifugally separated starch underflow, line 24 a return of the major part of the underflow back to the centrifuge rotor, and line 26 representing introduction of wash liquor into the return circuit 24.

In connection with the operation of centrifuge 21, I employ the subject-matter disclosed and claimed in Peltzer Patent No. 2,097,531, issued November 2, 1937, in order to secure a high gravity overflow, thus making it possible to dispense with conventional gluten settlers. Thus a part of the gluten overflow is shown being delivered by line 27, for carrying on the pulping operation 19, whereby a feed of the desired gravity is obtained for the centrifuge.

At this point it may be explained that the wash 26 for centrifuge 21 supplies liquid for carrying out starch in the underflow 23. In this connection, and in conjunction with the centrifugal separation taking place in the centrifuge rotor, the wash also effects a displacement of gluten and solubles from the starch particles. Thus the solubles are largely displaced and caused to pass out of the centrifuge together with the gluten in the overflow 20. This displacement action, in which the starch particles are received in a different liquid containing only a relatively low percentage of gluten and solubles, serves to effectively block solubles from the remaining part of the process in which the underflow is treated.

Thus my process differs from conventional processes utilizing tabling, in which there is no definite blocking of solubles at any corresponding point, and in which, after tabling, a relatively large amount of solubles must be removed from the starch by repeated washing.

Treatment in centrifuge 21, aside from effecting primary separation between starch and gluten and causing solubles to be displaced from the starch passing out in the underflow, simultaneously effects a classification with respect to the fine slop, as disclosed in co-pending application Serial No. 743,528, filed Sept. 11, 1934. Thus that part of the slop which is of a filamentary nature passes out with the gluten overflow 20, while the remainder of the slop, which can be readily washed and removed on silk screens, is removed in the underflow 23. As representative of suitable means for effecting removal of that part of the slop in underflow 23, I have indicated silk screens 29 and 31. The starch passing through these screens is subjected to further washing and dewatering operations, as represented by the starch filter 32. In a suitable arrangement for utilizing filtrates from the starch filter, the dry side filtrate can form the wash 26 for the centrifuge 21, while a part of the wet side filtrate 33 can provide a wash upon silk screen 31. Line 34 represents the use of material passing through screen 31, as a wash upon screen 29. The remainder of the wet side filtrate 33 can form the wash 16 for filter 14. The tailings from screen 31, represented by line 36, can be supplied to the slop expeller or filter of the milling system 11.

The thickened gluten overflow 20 from centrifuge 21 is shown being delivered to a dewatering apparatus 37, from which the gluten cake is discharged. Liquor from this dewatering operation can be utilized in the milling system 11 for various milling or washing operations, as indicated by line 38. The dewatering operation is accomplished without the use of conventional gravity gluten settlers, which is made possible by the production of a high gravity gluten overflow capable of being dewatered in a filter press or like equipment.

To briefly review the process of Fig. 1, the mill starch stream is subjected to dewatering in the filtering apparatus 14, and filtrates from this operation are utilized in the steeps and milling system. The percentage of solubles in the final filter cake is materially reduced by washing with liquid 16. After pulping or blending at 19, the material is fed to centrifuge 21 at a gravity best suited for this apparatus, say, 12 to 14 Baumé. Within the centrifuge 21, primary separation takes place between starch and gluten, a thickened gluten is discharged which can be delivered directly to a filter press or like apparatus 37 for dewatering, and solubles are largely displaced in the starch carried out in the underflow 23. Likewise, a classification of fine slop takes place in centrifuge 21, with the filamentary fine slop passing out with the gluten in the overflow 20, and the remainder of the fine slop passing out with the starch in the underflow 23. Treatment of the starch underflow on silk screens 29 and 31 serves to effect removal of the remaining fine slop. Further purification and dewatering of the starch passing through the silk screens is effected by the starch filter 32. Solubles pass out from the process in part from the steeps 10 with the slop and germs, and in part with the gluten from dewatering apparatus 37.

One particular feature of the process described above is the use of a pulping operation utilizing overflow from centrifuge 21, in conjunction with silk screening after centrifugal treatment, as distinguished from conventional silk screening for the removal of fine slop before primary separation between starch and gluten. Use of this type of pulping to produce a thickened gluten overflow would of itself tend to throw more load upon filter 14 by virtue of the greater quantity of filtrate to be removed. On the other hand, silk screening upon the centrifugally separated starch underflow tends to offset such apparent disadvantage, as it enables the production of a higher gravity mill starch stream 13, which in turn tends to minimize the load upon filter 14. In co-pending application Serial No. 743,528, filed Sept. 11, 1934, I have explained the advantages of placing silk after centrifugal treatment, and I have there pointed out why such a process enables the production of a higher gravity mill starch stream. Briefly, the absence of filamentary fine slop in the underflow 23 enables a material saving in the number of silk screens required, with a resulting economy in the amount of wash water required for the screening operation. Where conventional silk screening is employed in the milling system before primary separation, the silk screens of the fine slop system are subjected to serious clogging, due largely to the presence of filamentary fine slop and to the accumulation of slimes or like products resulting from the growth of bacteria or micro-organisms. Thus in the past a great number of silk screens have been required to remove the fine slop and to effect a substantial recovery of starch therefrom, and the relatively large quantity of wash liquor required for such screening has directly diluted the mill starch stream.

I refer above to slimes or like products resulting from the growth of bacteria or micro-organisms. In conventional wet starch processes such slimes tend to build up in the milling system, since no particular provision is made to effect their removal. Accumulation of such slimes on conventional silk screens causes considerable difficulty, requiring frequent scrubbing with chemicals to effect removal. In my process such slimes as are present in the feed to centrifuge 21 pass out largely with the gluten overflow 20. If it were necessary to thicken this gluten in a gravity settler, with decanted gluten liquor being returned for steeping or milling operations, a considerable quantity of such slimes would be returned back into the process, since the slimes do not settle out together with the gluten. With my thickened gluten overflow, such slimes are largely trapped with the gluten in the filter press 37 or like apparatus, so that the liquor 38 drawn off from this operation does not directly return the slimes to the process. This feature of my process, which tends to prevent building up of slimes to the degree experienced in conventional practice, contributes to the effectiveness and efficiency of silk screening after centrifugal separation between the starch and the gluten, because a minimum of such products is presented in the starch underflow 23. The growth of micro-organisms or bacteria in my process is also inhibited, by virtue of the relatively rapid movement of starch through the various steps, and because of the elimination of long settling periods for the gluten.

It is apparent that the above characteristics of my process make possible operation with a minimum amount of wash water and, as a consequence, a minimum draw-off of liquor from the steeps 10 to be evaporated. A relatively small amount of water is required for the essential washing operations after primary separation, and the amount of water utilized in the steeps 10 can be reduced to a minimum consistent with proper steeping action. Silk screening after centrifugal treatment, the absence of conventional gluten settlers presenting a relatively large amount of gluten draw-off water for re-use, and the blocking of solubles in centrifuge 21, all contribute to effect such economy. Furthermore, a possible increase in the concentration of solubles in the steeps and milling system, which in some instances may result from the use of a lesser amount of water for the steeping and milling operations, can cause no deleterious effects, because the blocking effect obviates the effect of such solubles on the silk screens 29 and 31, and because any possible accompanying increase in the growth of bacteria or micro-organisms is offset by the continual removal of slimes or like products together with the gluten. Blocking of solubles also materially simplifies further washing of the starch after passing through the silk screens 29 and 31, with the use of a minimum amount of wash water for such operations.

Fig. 2 illustrates diagrammatically the routing of water through the process of Fig. 1. It will be noted that fresh water enters at the tail end of the process by way of starch filter 32, and flows countercurrently through the various steps. The majority of this water passes out from the steeps 10 to the evaporating pans, while minor amounts pass out with the germs and slop 12 and with the gluten from apparatus 37. Tracing the flow of wash liquor after use in the starch filter 32, the liquid is removed in the dry side filtrate 26 as it enters centrifuge 21. Assuming that the amount of wash introduced into this centrifuge is substantially equal to the liquid flowing out with the starch in the underflow 23, the flow of water can then be traced through this underflow, to be returned to the starch filter 32. The water is again removed from the starch filter 32 in the wet side filtrate 33, a part of which serves as a wash upon silk screens 29 and 31 to form a substantially closed recirculation cycle which dilutes the starch flow to filter 32. The other part of filtrate 33, represented by line 16, flows back to the filter 14, where one portion merges with the filter cake in the repulping cycle 19, while the other portion forms the dry side filtrate 18 for return to the milling system 11. That portion of the water which merges with the filter cake in the repulping cycle 19 is delivered with the gluten overflow 20 to the dewatering apparatus 37. From dewatering apparatus 37 the majority of the liquid in the gluten overflow flows through the milling system 11, to merge with the mill stream 13 and to again be largely removed in the filter 14 for delivery to the steeps 10 by way of line 17. The other portion of the filtrate 16 which is supplied to filter 14, passes out with the dry side filtrate 18 to the milling system 11, where it eventually merges with the mill starch stream 13. Therefore this liquor likewise passes out with the wet side filtrate 17 to be returned to the steeps 10.

It is apparent that the water routing described above with respect to Fig. 2 will accomplish the desired washing operations effectively and economically, without detracting from the blocking of solubles in the centrifuge 21. It is also apparent that in counterflowing the wash liquor, successive operations are locked out with respect to preceding operations, with a definite displacement of water carried with the starch-bearing material from the steeps, at an early stage in the process.

In the process of Fig. 3 the milling system 11 departs from conventional practice in that silk screening is omitted from the grit system, as well as silk screening from the slop system. Thus a certain amount of grits is present in the mill starch stream 13a, which, under conventional practice, would have been removed by silk reels. Likewise, as the copper screens of the slop system remove only the coarse slop, there is also present in the mill starch stream a substantial amount of the fine slop which under conventional practice would have been removed in a fine slop system. Filter 14a is shown without the use of a wash, and with a single wet side filtrate draw-off 17. As a convenient utilization of this filtrate, a part is shown being returned to the steeps 10 and another part 43 to the milling system 11 for milling or washing operations. The cake removed from filter 14a is repulped at 19 and is then supplied as a feed to the centrifuge 21a. Treatment in this centrifuge, aside from effecting primary separation between starch and gluten, together with displacement of solubles and classification of the slop, also causes grits to pass out with the underflow 23. This material is then treated on silk screen 29, the tailings from which are again treated on screen 31. The material passing through these screens, consisting mainly of the finest starch particles, is merged to form a diluted feed 44 to a second centrifuge 21b. Interposed between the screens 29 and 31 there is a grinding mill 45, serving to grind the tailings from screen 29, thus effecting a recovery of starch on screen 31 from grits carried with the mill stream. The tailings 46 from screen 31, consisting mainly of that part of the slop passing out with the underflow 23, can be delivered to the slop expeller or filter of the milling system 11.

In centrifuge 21b the feed 44 is subjected to further centrifugal separation to form the overflow 47 and the starch underflow 48. The underflow is delivered to starch filter 49, similar to filter 32 of Fig. 1. Centrifuge 21b is also shown provided with a return circuit 51, with wash which can be filtrate 52 from the dry side of starch filter 49. The amount of wash 52 for centrifuge 21b may vary in accordance with different operating conditions or requirements, but good results have been secured by utilizing an amount which is somewhat in excess of the liquid passing out with the starch in the underflow 48, thereby causing a certain amount of the wash to flow countercurrently through the centrifuge rotor to be delivered in the overflow 47. The wash liquor for centrifuge 21a can be supplied by the wet side filtrate 53 from the starch filter 49. In order to provide wash liquor for screens 29 and 31, and at the same time to dilute the feed 44 within proper gravity limits for supplying centrifuge 21b, I prefer to divert a part of the overflow 47, as indicated by the branch line 54. The remainder of the overflow 47 can be used as a wash in operations proceeding the centrifuge 21a, suitable practice being to return it to the milling system 11, as indicated by line 56.

The process of Fig. 3 possesses the main characteristics and advantages of the process of Fig. 1. Since no special wash liquor is routed to the filter 14a, the action of this filter effects no substantial reduction in the concentration of solubles contained in the filter cake. Thus, in this instance the centrifuge 21a is relied upon to a greater extent to block solubles. The provision of two centrifuges operating in series, with silk screening interposed between the same, is a desirable arrangement in that it makes possible utilization of overflow from the second centrifuge as a wash upon the silk screens, which at the same time properly dilutes the material passing through the screens to serve as a feed within proper gravity limits for the second centrifuge.

A further characteristic of the process of Fig. 3 is that silk screens 29 and 31 perform a double function in that they serve to remove both starch grits and fine slop. As is well known, in prior conventional processes separate installations of silk are utilized to effect removal of grits in the grit starch system and to effect removal of fine slop in the slop system. By omitting all silk from the milling system, a further increase in the gravity of the mill starch stream is made possible because of the omission of wash on silk screens in the grit system, as well as of wash upon silk screens of the conventional fine slop system. It follows from these characteristics that the process of Fig. 3 makes possible a further increase in water economy.

In certain instances it may be desirable to so reduce the amount of water in the steeping operation that the fresh water added to the process may not be sufficient in carrying out certain operations. In such event I can employ the process shown in Fig. 4. In this instance the milling system has been divided into a grit system 11a and a slop system 11b, with a Buhr mill 61 for grinding material drawn off from the grit system and delivered to the slop system. In both the grit and slop systems silk reels or screens are omitted, so that the mill starch stream 13a is substantially the same as the mill starch stream of Fig. 3. The filter 14 has been shown substantially the same as in Fig. 1, with a supply of wash 16 and separate draw-off of wet and dry side filtrates 17 and 18 respectively. There may be an insufficient amount of liquid available from the starch filter or filters through line 53, to supply wash liquor to the centrifuge 21a. Thus, to supply a wash liquor ample in total amount to carry out the starch in the underflow 23, I provide a further wash liquor which can be taken in part through the branch line 62 leading from the overflow line 63 of centrifuge 21b. This wash is further supplemented by liquid conducted through branch line 67. As represented by line 68, material passing through screen 31 can be used as a wash upon screen 29, as well as the wash 69 diverted from overflow 63. Material returned to centrifuge 21a by way of branch line 67 can be relatively dilute starch-bearing liquor flushed through screen 29 in the washing operations upon the same.

In place of utilizing a single starch filter, or two or more filters in parallel, as indicated in Figs. 1 and 3, Fig. 4 discloses two filters 49a and 49b which operate in series. The starch underflow 71 from centrifuge 21b is delivered to the first filter 49a, and then the starch filter cake, after being washed with fresh water, is delivered to the second filter 49b by line 72. Here the filter cake is again washed with fresh water before its final delivery. Wet starch filtrate from filter 49a can form a part of the wash 53 for the first centrifuge 21a. Dry side filtrate 73 from the first filter can in part be delivered as a wash liquor to the second centrifuge 21b. The remainder of the wash liquor for centrifuge 21b can be made up of wet starch filtrate 74 from the filter 49b. The starch underflow 71 from the second centrifuge may be at too high a gravity for direct delivery to the filter 49a; therefore, as indicated by line 76, it can be diluted by a part of the dry side filtrate 73. The starch flow 72 to the second filter 49b may likewise be of too high a gravity; therefore, it is shown being diluted by the dry side filtrate 77 from filter 49b. To compensate for a possible upflow of a part of the wash through centrifuge 21b (that is, that part of the wash which may flow countercurrently through the centrifuge rotor to be discharged together with the overflow), I have indicated a proper amount of fresh water being introduced to the second starch filter 49b by line 78, which additional water eventually merges with the wet side filtrate 74.

From the above description of Fig. 4, it will be evident that I have provided a process in which the amount of water used in the steeps may be reduced to a minimum, but which at the same time will afford an ample amount of water in the filter 14 and in the operations following the same, without departing from the desired countercurrent principle, and with a minimum amount of fresh water consumption.

In the utilization of my invention, or of certain features thereof, one skilled in the art may be expected to make certan changes or adjustments to adapt the process to the equipment available or to prevailing conditions or requirements. The various flow sheets illustrated in the drawings are to be taken as diagrammatic representations of the various operations and equipment utilized, leaving a wide latitude of selection and arrangement in making commercial installations. For example, where single pieces of equipment are indicated, it is evident that two or more pieces of equipment can be utilized to secure a desired capacity. In place of a filter having a wet side and a dry side for dewatering the mill starch stream, two or more filters may be employed, one of which may be of a batch type for clarifying the filtrate. Likewise washing of filter cake can be accomplished in a second or other filter of a series. While a Peltzer type centrifuge, utilizing a continuous return circuit back into the rotor, has given good results, a centrifuge of this genus can be employed without a return circuit but with an additional supply of wash liquor to provide liquid for carrying out starch in the underflow. With respect to carrying out silk screening after primary separation between starch and gluten, it should be appreciated that this operation may not follow immediately after the first centrifugal separation but may follow two or more centrifuges operating in series or in parallel. For example, with the arrangement of Fig. 3, in which two centrifuges operate in series, the silk screening may follow the second centrifuge.

This application is a continuation of my copending application Serial No. 743,529, filed Sept. 11, 1934.

I claim:

1. In a wet starch manufacturing process in which starch bearing material is treated by milling operations to form a mill starch stream containing fine slop, the improvement comprising dewatering the mill starch stream to form a cake, repulping the cake, subjecting the repulped material to a centrifugal separating operation whereby gluten is discharged in an overflow and starch is discharged in an underflow, the centrifugal separating operation also serving to effect a classification of the fine slop whereby a part of the fine slop passes out in the gluten overflow and the remainder of the slop passes out with the starch in the underflow, utilizing a part of the gluten overflow to repulp said cake whereby the overflow is thickened, subjecting the gluten overflow to dewatering without gravity settling, to effect removal of gluten together with slimes or like products resulting from the growth of micro-organisms or bacteria, and then subjecting the starch underflow to screening for the removal of slop therefrom.

2. In a wet starch manufacturing process in which starch bearing material is treated in steeping and milling systems to afford a mill starch stream, the milling system being characterized by the substantial absence of screening for the removal of fine slop whereby the mill starch stream contains the fine slop which otherwise would have been removed, the improvement comprising effecting dewatering of the mill starch stream to form a cake, subjecting the cake to repulping, subjecting the repulped material to centrifugal separation whereby gluten passes out in an overflow and starch passes out in an underflow, the centrifugal separation also serving to effect a classification of fine slop whereby a part of the slop passes out with the overflow and the remainder of the slop passes out with the underflow, utilizing a part of the overflow to carry out said repulping operation whereby the overflow is thickened without the use of conventional gluten settlers, and then subjecting the starch underflow to screening for the removal of slop carried therein.

3. In a wet starch manufacturing process in which starch bearing material is treated in steeping and milling systems to afford a mill starch stream, the milling system being characterized by the substantial absence of fine screening for the removal of fine slop whereby the mill starch stream contains the fine slop which otherwise would have been removed, the improvement comprising subjecting the mill starch stream to dewatering to form a cake, repulping the cake, subjecting the repulped cake to centrifugal separation whereby gluten passes out in an overflow and starch passes out in an underflow, utilizing a part of the gluten overflow to repulp said cake whereby the gluten overflow is thickened without the use of conventional gluten settlers, the centrifugal separation also serving to effect a classification of fine slop whereby filamentary slop passes out with the overflow and another part of the slop passes out with the underflow, supplying a wash liquor to the centrifugal separating operation to provide liquid for the starch underflow and to effect substantial displacement of gluten and solubles from the starch, said wash liquor having a relatively low percentage of solubles compared with the percentage of solubles in the mill starch stream, subjecting the thickened gluten overflow to dewatering, utilizing the water so removed in operations preceding said centrifugal separation, and subjecting the starch underflow to screening for the removal of slop carried therein.

4. In a wet starch manufacturing process in which corn is treated in steeping and milling operations to afford a mill starch stream, the milling system being characterized by the substantial absence of fine screens for the removal of fine slop whereby the mill starch stream contains the fine slop which otherwise would have been removed, subjecting the mill starch stream to filtration to form a filter cake, utilizing filtrate from said filtering operation as liquor in the steeping system, subjecting the filter cake to repulping, subjecting the repulped material to centrifugal separation thereby forming a gluten overflow and a starch underflow, utilizing a part of said gluten overflow to carry out said repulping operation whereby the gluten overflow is thickened without the use of conventional gluten settlers, the centrifugal separation also serving to effect a classification of fine slop whereby a part of the fine slop passes out in the gluten overflow and the remainder of the slop passes out in the underflow, supplying a wash liquor to the centrifugal separating operation to provide liquid for the starch underflow and to effect substantial displacement of gluten and solubles from the starch, said wash liquor containing a relatively low percentage of solubles compared with the percentage of solubles in the mill starch stream, subjecting the starch underflow to screening for the removal of slop carried therein, subjecting the screened starch to filtration and further washing, and diverting filtrate from said last operation and introducing the same back into the process at a point preceding said filtration and further washing.

5. In a wet starch manufacturing process in which starch bearing material is treated in steeping and milling operations to afford a mill starch stream, the improvement comprising subjecting the mill starch stream to filtration, subjecting the filter cake during said filtering operation to washing by liquor containing a relatively low percentage of solubles, removing a wet side filtrate from said filtering operation which contains a relatively high percentage of solubles, removing a dry side filtrate which contains a substantially lower percentage of solubles, utilizing said wet side filtrate to carry on said steeping operation, utilizing said dry side filtrate for washing operations in the milling system, effecting a repulping of the filter cake to form a starch bearing liquor relatively higher in gravity than the original mill starch stream, subjecting said repulped material to primary separation for the removal of starch from a gluten overflow, and using a part of said overflow for said repulping operation.

6. In a wet starch manufacturing process in which starch bearing material is treated in steeping and milling operations to afford a mill starch stream, the improvement comprising subjecting the mill starch stream to filtration, subjecting the filter cake during said filtering operation to washing by liquor containing a relatively low percentage of solubles, removing a wet side filtrate from said filtering operation which contains a relatively high percentage of solubles, removing a dry side filtrate which is substantially lower with respect to the percentage of solubles, utilizing said wet side filtrate to carry on said steeping operation, utilizing said dry side filtrate for washing operations in the milling system, effecting a repulping of the filter cake, subjecting said repulped material to centrifugal separation whereby gluten passes out in an overflow and starch passes out in an underflow, supplying to the centrifugal separating operation a wash liquor containing a relatively low percentage of solubles to provide liquor for the starch underflow and to effect substantial displacement of gluten and solubles from the starch, subjecting the underflow to further treatment for purification of the starch, and using a part of the gluten overflow to repulp the filter cake.

7. In a wet starch manufacturing process in which starch bearing material is treated in steeping and milling operations to afford a mill starch stream, the improvement comprising carrying out the milling operations in the substantial absence of silk screening whereby the mill starch stream contains fine slop which otherwise would have been removed, subjecting the mill starch stream to filtration, subjecting the filter cake during said filtering operation to washing by liquor containing a relatively low percentage of solubles, removing a wet side filtrate from said filtering operation which contains a relatively high percentage of solubles, removing a dry side filtrate which contains a relatively low percentage of solubles, utilizing said wet side filtrate to carry on said steeping operation, utilizing the dry side filtrate for washing operations in the milling system, effecting a repulping of the filter cake, subjecting said repulped material to centrifugal separation whereby gluten passes out in an overflow and starch passes out in an underflow, utilizing a part of said overflow for said repulping operation whereby said overflow is thickened, causing a classification of fine slop to take place simultaneously with said centrifugal separating operation whereby a part of the fine slop passes out in the gluten overflow and another part passes out with the starch in the underflow, supplying to the centrifugal separating operation a wash liquor containing a relatively low percentage of solubles to provide liquor for the starch underflow and to effect substantial displacement of gluten and solubles from the starch, and then subjecting the underflow to screening for the removal of slop carried therein.

8. In a wet starch manufacturing process in which starch bearing material is treated to form a wet material including starch, gluten and fine fiber containing slop, the steps of blending said material with a diluting medium, subjecting the diluted material to centrifugal separation whereby gluten and a substantial portion of the slop are discharged in an overflow and starch together remaining slop in an underflow, subjecting the underflow to fine screening for removal of fiber therefrom, and using a part of the gluten overflow as said diluting medium.

9. In a wet starch manufacturing process in which starch bearing material is treated in steeping and milling operations to afford a mill starch stream, the improvement comprising carrying out the steeping operation with a minimum amount of water consistent with proper steeping action whereby a minimum amount of water is drawn off from the steeping operation for evaporation, effecting milling operations upon the steeped material without the use of conventional fine screening operations whereby a relatively high gravity starch bearing material is produced containing starch grits and fine slop in addition to finer starch particles and gluten, subjecting said starch bearing material to dewatering, diluting the dewatered material, subjecting the resulting material to centrifugal separation thereby forming a gluten overflow and a starch underflow, utilizing a part of the gluten overflow to carry out said diluting operation, supplying a wash liquor to said centrifugal separating operation whereby the gluten and the solubles are displaced from the starch particles passing out in the underflow, the centrifugal separation also serving to effect a classification of slop whereby a part of the slop is caused to pass out with the gluten overflow and the remainder of the slop to pass out in the starch underflow, and subjecting the underflow to screening for the simultaneous removal of slop and grits carried therein.

10. In a wet starch manufacturing process in which starch bearing material is treated to form a wet material including starch, gluten and fine fiber-containing slop, the improvement comprising dewatering the material, diluting the dewatered material, subjecting the diluted material to centrifugal separation whereby gluten together with a substantial portion of the slop passes out in the overflow and starch together with the remainder of the slop passes out in an underflow, utilizing a part of the overflow to carry out said diluting operation, and then subjecting the starch underflow to fine screening for the removal of slop carried therein.

11. In a wet starch manufacturing process in which starch bearing material is treated to form a wet material including starch, gluten and fine fiber-containing slop, said material containing an insufficient amount of moisture for direct centrifugal treatment of the same, the improvement comprising blending said material with a diluting medium to form a diluted material of proper gravity for centrifugal separation, subjecting the diluted material to centrifugal separation whereby gluten and a substantial portion of the slop are discharged in an overflow and starch together with remaining slop in an underflow, subjecting the underflow to fine screening for removal of slop therefrom, and utilizing a part of the gluten overflow as said diluting medium.

12. In a wet starch manufacturing process in which starch bearing material is treated to form a wet material including starch grits, finely divided starch, gluten and fine fiber-containing slop, said last named material containing an insufficient amount of moisture for direct centrifugal treatment of the same, the improvement comprising blending said wet material with a diluting medium to form a diluted material of proper gravity for centrifugal separation, subjecting the diluted material to centrifugal separation whereby gluten and a substantial portion of the slop are discharged in an overflow and finely divided starch together with starch grits and remaining slop discharged in an underflow, subjecting the underflow to fine screening for removal of grits and slop therefrom, and utilizing a part of the gluten overflow as said diluting medium.

ALBERT PELTZER.